United States Patent [19]
Smith

[11] Patent Number: 5,501,197
[45] Date of Patent: Mar. 26, 1996

[54] FUEL INJECTION APPARATUS

[75] Inventor: Paul J. Smith, Peterborough, Great Britain

[73] Assignee: Perkins Limited, Cambridgeshire, Great Britain

[21] Appl. No.: 260,069

[22] Filed: Jun. 15, 1994

[30] Foreign Application Priority Data

Jun. 15, 1993 [GB] United Kingdom ............ 9312288

[51] Int. Cl.$^6$ .................................................. F02M 37/04
[52] U.S. Cl. ........................................ 123/509; 123/511
[58] Field of Search ................................ 123/446, 508, 123/509, 510, 511

[56] References Cited

U.S. PATENT DOCUMENTS

| | | | |
|---|---|---|---|
| 3,516,395 | 6/1970 | Bassot et al. | 123/446 |
| 4,448,168 | 5/1984 | Komada et al. | 123/446 |
| 4,459,959 | 7/1984 | Terada et al. | 123/446 |
| 4,480,619 | 11/1984 | Igashira et al. | 123/446 |
| 4,844,035 | 7/1989 | Takagi | 123/446 |
| 5,297,523 | 3/1994 | Hafner et al. | 123/446 |
| 5,355,856 | 10/1994 | Paul et al. | 123/446 |

FOREIGN PATENT DOCUMENTS

| | | |
|---|---|---|
| 2496170 | 6/1982 | France . |
| 694245 | 7/1940 | Germany . |
| 56290 | 3/1936 | Norway ................ 123/508 |
| 327183 | 3/1930 | United Kingdom . |
| 982334 | 3/1962 | United Kingdom . |
| 2104158 | 3/1983 | United Kingdom . |
| 2195708 | 4/1988 | United Kingdom . |
| WO92/19860 | 11/1992 | WIPO . |

*Primary Examiner*—Thomas N. Moulis
*Attorney, Agent, or Firm*—Nilles & Nilles

[57] ABSTRACT

A fuel injection system for an internal combustion engine. The system includes an injector assembly for injecting fuel under pressure into the combustion chamber of an engine. The system also includes an intensifier assembly for intensifying the pressure of the fuel supplied to the injector assembly. This is incorporated in the cylinder head or attached to the cylinder head or an engine valve cover of the engine remote from the injector assembly. Intensified fuel passes from the intensifier assembly to the injector assembly via a conduit. This arrangement of injector assembly, intensifier assembly and fuel conduit reduces the over cylinder space required, particularly for a cylinder head arrangement with vertically projecting injector assemblies.

22 Claims, 4 Drawing Sheets

FUEL INJECTION APPARATUS

BACKGROUND OF THE INVENTION

1. Field of the Invention

The invention relates to fuel injectors principly for the injection of fuel into the combustion chambers of diesel engines.

2. Discussion of the Related Art

Injectors are known in which the means for intensifying the pressure of fuel destined to be injected is carried on the injector body the advantage being that failure of any part of the intensifier including the controls therefor does not necessitate a dismantling of a whole hydraulic/fuel system and allows quick replacement of a faulty part. In certain cases as for instance in the system shown in U.S. Pat. Re. No. 33270 the benefits include total containment of very highly pressurised fuel within an injector assembly. Such injectors are usually inserted into a bore in the cylinder head so that a nozzle just protrudes into a combustion space formed when the piston reaches the top of its stroke. Such a combustion space can be an antechamber formed in the cylinder head or it can be a bowl formed in the crown of the piston. The antechamber type of combustion system is called an indirect injection system and the bowl-in-the-piston is called a direct injection system. It is well known that the direct injection system is a more efficient system because air and gases do not have to pass through a constriction, as in the indirect injection system and hence more air can be fed into it in a given time. In the search for methods of allowing more air into the direct injection combustion chamber of a diesel engine cylinder multiple inlet valves are becoming commonly employed. Whilst, in the case of a cylinder head having one inlet and one exhaust valve per cylinder the injector bore can be made in the side of the cylinder head where there is plenty of room, for an injector in a cylinder head which carries for instance two inlet and two exhaust valves there is very little room for an injector except in the space at the centre of the four valves. This necessitates that the injector shall project vertically from the top of the cylinder head. Problems consequent on the adoption of this arrangement are a) that the injector assembly is too tall and b) it interferes with the valve gear which of necessity must occupy the space.

OBJECTS AND SUMMARY OF THE INVENTION

The object of the present invention is to obviate or mitigate the foregoing problems.

According to the present invention a fuel injection system is characterised in that it comprises an injector assembly adapted to be inserted into a cylinder head of an internal combustion engine, an intensifier assembly adapted to be inserted into the cylinder head or attached to the cylinder head or an engine valve cover remote from said injector assembly, a first port for the supply of fuel to the intensifier assembly, a second port for the supply of intensifier fluid to the intensifier assembly, a third port for the supply of intensified pressure fuel to said injector assembly through conduit means whereby fuel supplied through said first port is intensified by fluid supplied through said second port and is delivered at intensified pressure to said injector assembly.

As a further preference a solenoid operated valve is incorporated into said intensifier assembly for the purpose of regulating the timing of the intensification.

The solenoid operated valve may also regulate the timing of the injection of the intensified fuel by the injector assembly.

The fluid supplied through the second port may be fuel at a pressure which may be continuously varied according to the degree of intensification required at a given moment or it may be an auxiliary fluid provided for the same or a like purpose.

Each intensifier and valve assembly may be incorporated into a housing having all three ports formed in it such housing being attached to the side of a cylinder head or the engine valve cover.

Alternatively, several intensifier and valve assemblies may be incorporated into a single housing having all three ports formed in it as internal longitudinal bores or rails extending through the greater part of its length, such single housing being attached to the side of a cylinder head.

As a further alternative the intensifier and valve assemblies may be incorporated in appropriate bores in the cylinder head such bores being arranged to intersect the appropriate rails to form the corresponding first and second ports.

A further addition or alternative is to arrange for the engine valve cover to enclose the third valve port and that the conduit means between the third port and the injector consists of a thick walled pipe.

As an alternative the third port may lie outside the valve cover and the thick walled pipe will pass through an aperture in the valve cover, there being a further aperture or apertures in the valve cover which will allow attachment of the thick walled pipe to the injector by tools inserted through the further aperture or apertures. The provision of removable inserts for closing the further apertures is the subject of our United Kingdom Patent published as No. 2 138 502.

In an embodiment where the third port lies outside the valve cover, the injector assembly may protrude through an aperture in the valve cover such that the conduit means between the third port and the injector assembly also lies outside of the valve cover.

Alternatively, in an embodiment where the third port lies outside the valve cover, the conduit means between the third port and the injector assembly may comprise an external conduit section which connects with an internal bore in a cylinder head.

BRIEF DESCRIPTION OF THE DRAWINGS

The invention will now be described with reference to the accompanying drawings of which.

DETAILED DESCRIPTION OF THE PREFERRED EMBODIMENTS

Figure 1:
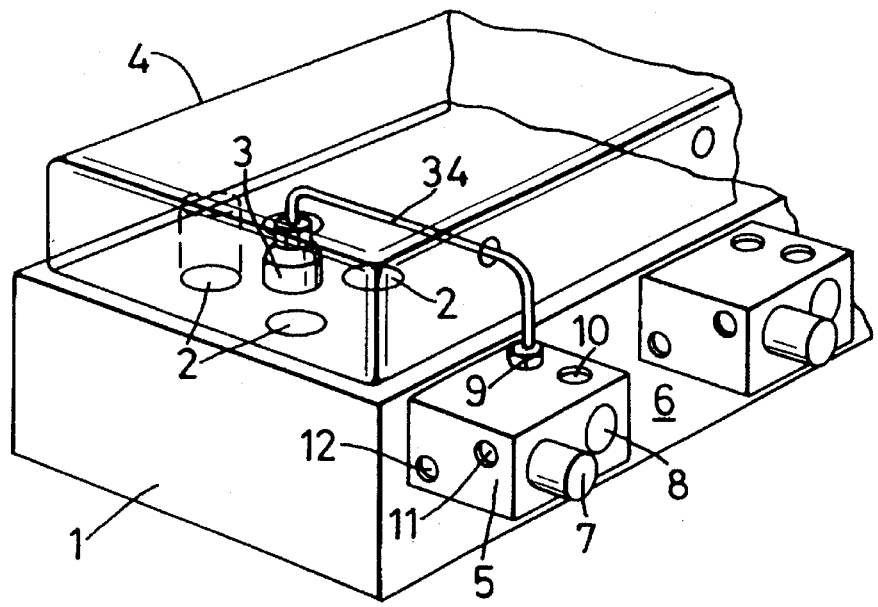
FIG. 1 represents a first embodiment.

In FIG. 1 there is shown a cylinder head 1 having four valves 2 symbolically represented and a fuel injector assembly 3 located in the center of them so as to be held in a vertical bore with its nozzle projecting into a combustion chamber at the top of the cylinder. A valve cover 4 is shown in ghosted outline on top of the cylinder head.

A housing 5 is fastened to the side 6 of the cylinder head 1 and it contains a valve and solenoid assembly 7, an intensifier assembly 8 and three ports for passage of fluid. Port 9 at the top of the housing is for passing fuel at injection pressures to the injector assembly 3, port 10 is for the purpose of supplying fuel to the intensifier assembly in the case when intensifier fluid other than fuel is in use for intensification purposes and port 11 is for the supply of intensifier fluid, which may be fuel, lubricating oil or any other convenient fluid, at a controlled pressure which is continuously varied according to the degree of intensification required at a given moment. The port 12 is a spill port for the intensifier fluid.

Figure 2:
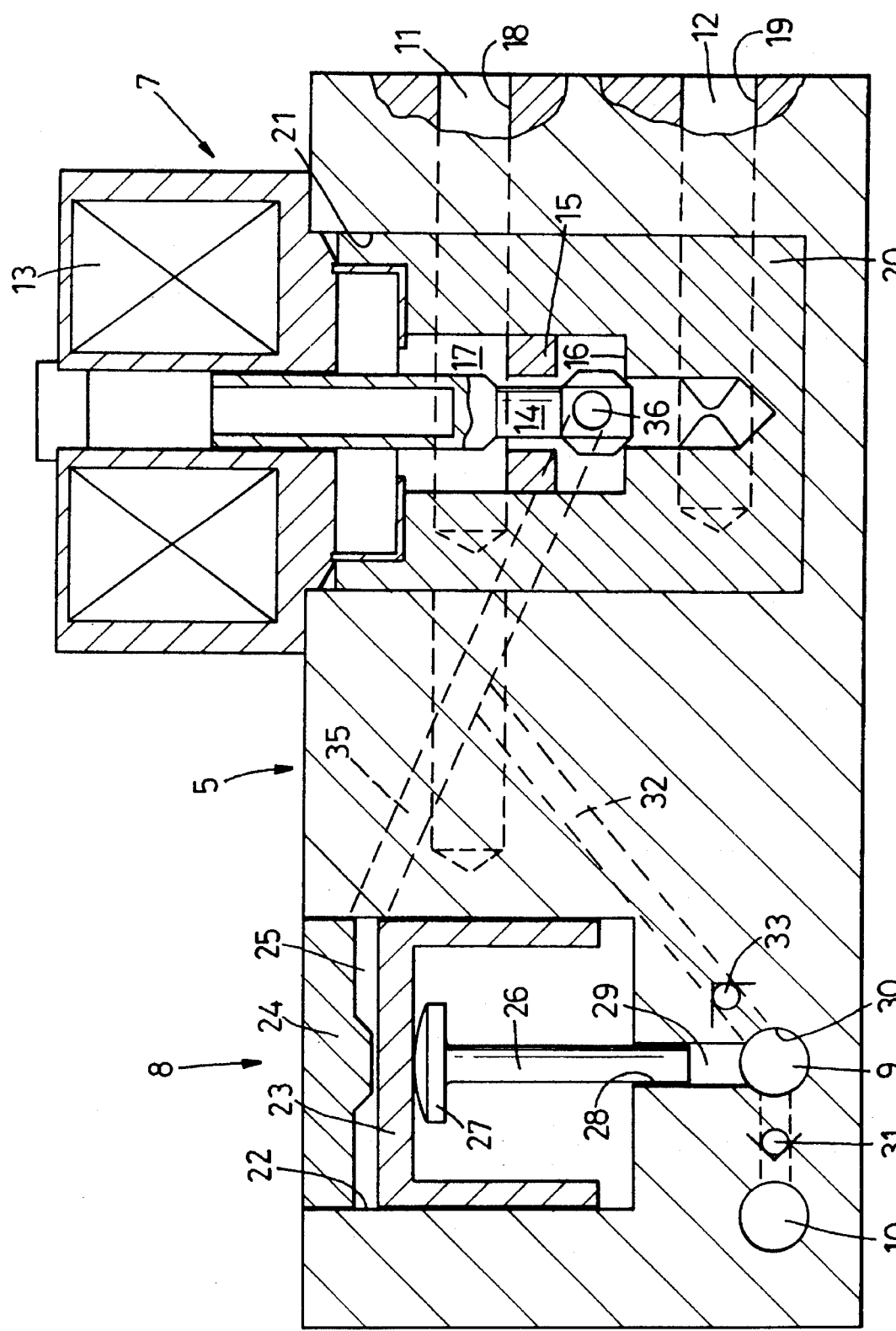
FIG. 2 represents a cut-away of an intensifier valve and solenoid assembly shown in FIG. 1.

Referring now to FIG. 2 the intensifier assembly 8 is seen in a horizontal median section except for scrap horizontal sections at the levels of the ports 11 & 12. A solenoid 13 controls the movement of a valve 14 which is able to move between seats 15 & 16. The valve 14 moves in a bored chamber 17 which is connected to port 11 by an intersecting drilling 18 and to port 12 by an intersecting drilling 19. The valve and solenoid assembly is conveniently contained in a cartridge 20 which fits closely into a bore 21 in the housing 5.

A neighboring bore 22 in the housing forms a cylinder in which a piston 23 is disposed. This bore is fluid tightly closed by a removable plug 24 capable of sustaining the forces arising from pressurised fluid which is periodically introduced into the low pressure chamber 25 formed between the piston 23 and plug 24.

Chamber 25 is permanently connected by internal passages represented by notional passage 35 in FIG. 2 to a port 36 located in chamber 17 between the valve seats 15 and 16.

Downward movement of the piston 23 causes the plunger 26 having a mushroom shaped head 27 to move downwards in a cylinder 28 and compresses fuel contained in the small chamber 29. The chamber 29 is connected by an intersecting drilling 30 to port 9.

In the circumstances when the intensifying fluid is oil or other non-fuel liquid, fuel is fed to the chamber 29 from the port 10 through a non return valve 31. In the case where the intensifying fluid is fuel a convenient cross passage 32 having a non-return valve 33 and connecting to drilling 18 and port 11, is used to supply fuel for intensification.

What happens to the intensified fuel and the manner in which it is eventually injected into the combustion chamber forms no part of the invention, but in general when the valve is seated in valve seat 16 pressurised fluid may flow from port 11 through drilling 18 past valve seat 15 through port 36 and passage 35 into chamber 25 there to exert downward pressure on piston 23 for intensifying fuel in chamber 29. When the valve 14 is caused to close valve seat 15 by operation of the solenoid 13, fluid may still flow out of chamber 25 through passage 35 and port 36 past valve seat 16 through drilling 19 to port 12, so depressurising the fuel in chamber 29 the solenoid 13 is controlled in a known manner to regulate the timing of fuel intensification and injection.

The housing 5 is preferably mounted on the air intake side of the cylinder head because it is cooler than the exhaust side.

The engine is equipped with as many housings 5 attached to the cylinder head as there are injectors.

In the embodiment shown in FIG. 1 the port 9 is connected to the injector by a thick walled pipe 34 which passes through a side wall of the cover 4. This gives rise to the problem of needing to tighten the connection between the pipe and the injector inside the cover. This is overcome by providing access apertures in the cover which can be closed by plastic or like closures.

Figure 3:
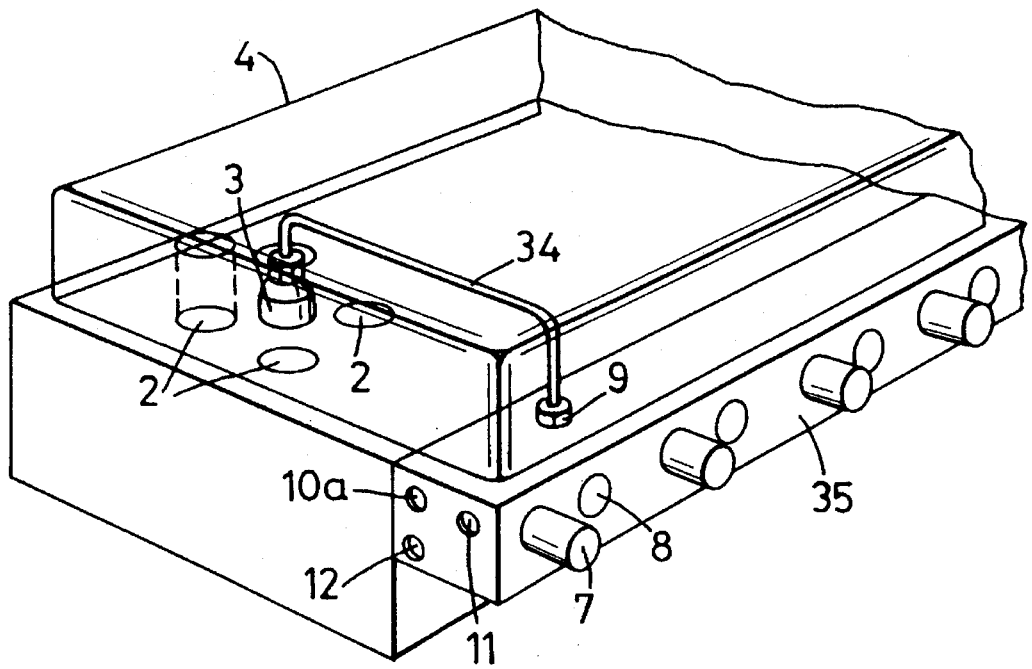
FIG. 3 represents a second embodiment.

In the embodiment shown in FIG. 3 the series of housings 5 have been amalgamated into one housing 35 there being long drillings rails corresponding to drillings 18 & 19 in FIG. 2 which extend the full length of the housing 35. In this case the cover is not perforated to receive the thick walled pipe 34 and it covers and protects all the pipe work leading to all the injectors whilst presenting a neat appearance.

Figure 4:
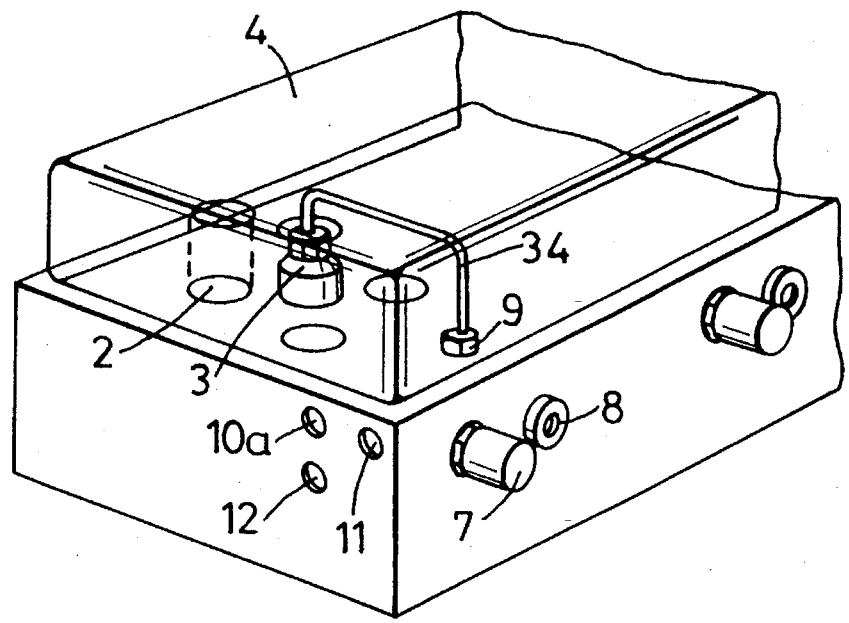
FIG. 4 represents a third embodiment.

In the embodiment shown in FIG. 4 the cylinder head itself has been enlarged to receive the valve and solenoid assemblies and the intensifier assemblies in intensifier bores. The ports 11 & 12 are common to all whilst being remote from some of the valve and solenoid assemblies. The ports 10 for independent supply of fuel are not shown individually in FIGS. 3 & 4 but as a common rail supply at 10a & 10b respectively serving all of the intensifier units 8.

Figure 5:
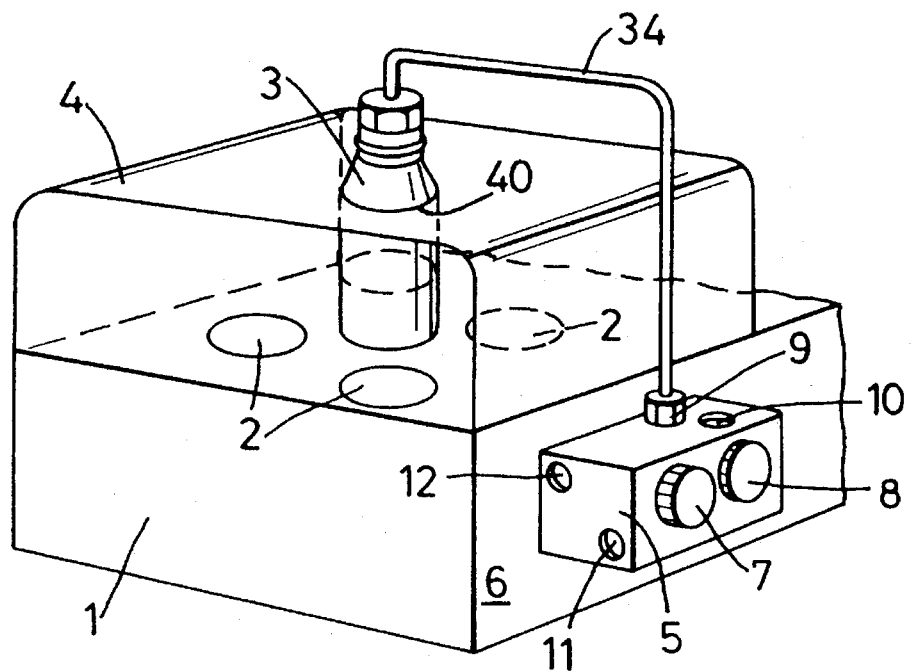
FIG. 5 represents a fourth embodiment.

In the embodiment shown in FIG. 5, the housing 5 containing the valve and solenoid assembly 7 and the intensifier assembly 8 is attached to the side 6 of the cylinder head 1. The injector assembly 3 protrudes through a respective aperture 40 in the valve cover 4. As such, the thick walled pipe 34 connecting the third port 9 with the injector assembly 3 lies entirely outside the valve cover 4.

Figure 6:
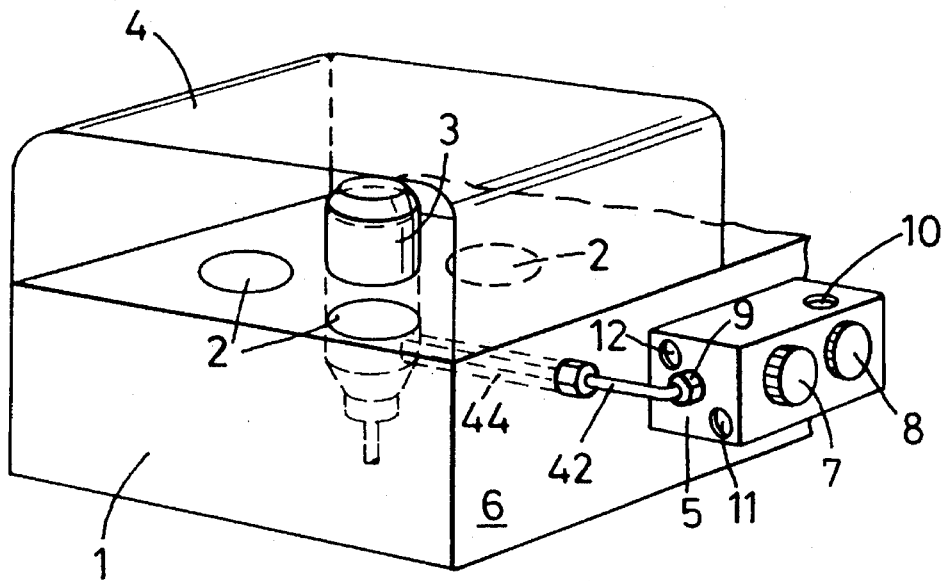
FIG. 6 represents a fifth embodiment.

In the embodiment shown in FIG. 6, the conduit means connecting the port 9 to the injector assembly 3 comprises an external pipe section 42 which connects with a bore 44 extending through the cylinder head from the side 6 to the injector assembly 3. This provides much greater access for maintenance and replacement of faulty parts.

Figure 7:
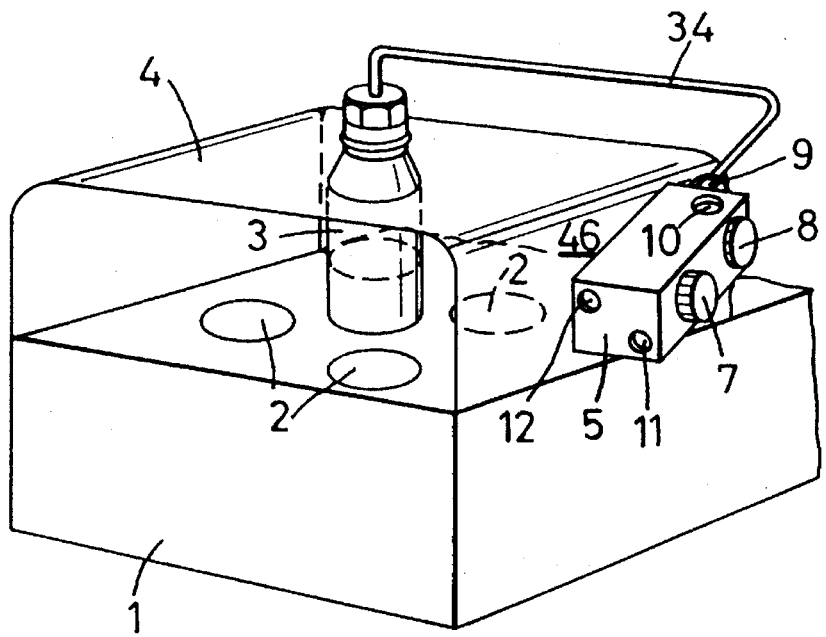
FIG. 7 represents a sixth embodiment.

In the embodiment shown in FIG. 7 the housing 5 is attached to a side 46 of the valve cover 4. This embodiment is similar to the embodiment of FIG. 5 in that the pipe 34 connecting the port 9 to the injector assembly 3 lies outside the valve cover 4.

I claim:

1. A fuel injection system comprising an injector assembly adapted to be inserted into a cylinder head of an internal combustion engine; an intensifier assembly adapted to be one of (a) inserted into the cylinder head, (b) attached to the cylinder head, or (c) attached to an engine valve cover remote from said injector assembly; a first port for the supply of fuel to the intensifier assembly; a second port for the supply of intensifier fluid to the intensifier assembly; a third port for the supply of pressure intensified fuel to said injector assembly through a conduit, whereby fuel supplied through said first port is intensified by fluid supplied through said second port and is delivered at intensified pressure to said injector assembly; and a solenoid operated valve incorporated in said intensifier assembly for the purpose of regulating the timing of fuel intensification.

2. A fuel injection system as claimed in claim 1, wherein the solenoid operated valve also regulates the timing of the injection of the intensified fuel by the injector assembly.

3. A fuel injection system as claimed in claim 1, wherein the fluid supplied through the second port is fuel.

4. A fuel injection system as claimed in claim 1, wherein the fluid supplied through the second port is an auxiliary fluid.

5. A fuel injection system as claimed in claim 1, wherein the fluid supplied through the second port is supplied at a pressure which is continuously varied according to the degree of intensification required at a given moment.

6. A fuel injection system as claimed in claim 1, wherein the intensifier assembly is incorporated into a housing having all three ports formed therein such that the housing is able to be attached to a side of the cylinder head.

7. A fuel injection system comprising an injector assembly adapted to be inserted into a cylinder head of an internal combustion engine; an intensifier assembly adapted to be one of (a) inserted into the cylinder head, (b) attached to the cylinder head, or (c) attached to an engine valve cover remote from said injector assembly; a first port for the supply of fuel to the intensifier assembly; a second port for the supply of intensifier fluid to the intensifier assembly; and a third port for the supply of pressure intensified fuel to said injector assembly through a conduit, whereby fuel supplied through said first port is intensified by fluid supplied through said second port and is delivered at intensified pressure to said injector assembly, wherein the intensifier assembly is incorporated into a housing having all three ports formed therein such that the housing is able to be attached to a side of the cylinder head, and wherein the housing incorporates several intensifier assemblies having all three ports formed in it as internal longitudinal rails extending through the greater part of its length, such that the housing can be attached to the side of the cylinder head.

8. A fuel injection system comprising an injector assembly adapted to be inserted into a cylinder head of an internal combustion engine; an intensifier assembly adapted to be one of (a) inserted into the cylinder head, (b) attached to the cylinder head, or (c) attached to an engine valve cover remote from said injector assembly; a first port for the supply of fuel to the intensifier assembly; a second port for the supply of intensifier fluid to the intensifier assembly; and a third port for the supply of pressure intensified fuel to said injector assembly through a conduit, whereby fuel supplied through said first port is intensified by fluid supplied through said second port and is delivered at intensified pressure to said injector assembly, wherein several intensifier assemblies are incorporated in appropriate bores in the cylinder head, the cylinder head having rails formed internally therein, the bores being arranged to intersect appropriate rails to form corresponding first and second ports.

9. A fuel injection system as claimed in claim 1, wherein the engine valve cover encloses the third port and the conduit connecting the third port and the injector assembly.

10. A fuel injection system as claimed in claim 1, wherein the third port lies outside the valve cover and the conduit passes through an aperture in the valve cover, there being at least one further aperture in the valve cover to allow attachment of the conduit to the injector assembly by tools inserted through the further aperture.

11. A fuel injection system as claimed in claim 1, wherein the third port lies outside the valve cover and the injector assembly protrudes through an aperture in the valve cover such that the conduit between the third port and the injector assembly lies outside the valve cover.

12. A fuel injection system as claimed in claim 1, wherein the third port lies outside the valve cover and the conduit between the third port and the injector assembly comprises an external conduit section which connects with an internal bore of a cylinder head.

13. A fuel injection system as claimed in claim 1, wherein the conduit is a thick-walled pipe.

14. A fuel injection system for an internal combustion engine having a cylinder head capped by a valve cover, said fuel injection system comprising:

A. an injector assembly inserted into said cylinder head;
B. an intensifier assembly mounted on said internal combustion engine at a location remote from said injector assembly, said intensifier assembly including a pressure intensifier and having formed therein a first port for the supply of fuel to said pressure intensifier, a second port for the supply of intensifier fluid to said pressure intensifier, and a third port for the supply of pressure intensified fuel to said injector assembly;
C. a conduit connecting said third port of said intensifier assembly to said injector assembly; and
D. a solenoid operated valve which is connected to said intensifier assembly and which controls operation of said intensifier assembly.

15. A fuel injection system as claimed in claim 14, wherein said intensifier assembly comprises a housing having said pressure intensifier disposed therein and in which is formed said first, second, and third ports.

16. A fuel injection system as claimed in claim 15, wherein said housing is mounted on a side of said cylinder head.

17. A fuel injection system for an internal combustion engine having a cylinder head capped by a valve cover, said fuel injection system comprising:

A. an injector assembly inserted into said cylinder head;
B. an intensifier assembly mounted on said internal combustion engine at a location remote from said injector assembly, said intensifier assembly including a pressure intensifier and having formed therein a first port for the supply of fuel to said pressure intensifier, a second port for the supply of intensifier fluid to said pressure intensifier, and a third port for the supply of pressure intensified fuel to said injector assembly; and
C. a conduit connecting said third port of said intensifier assembly to said injector assembly, wherein
  (1) said intensifier assembly comprises a housing which is mounted on a sidewall of said cylinder head, which has said pressure intensifier disposed therein, and in which is formed said first, second, and third ports, wherein
  (2) said housing receives several intensifier assemblies each including a pressure intensifier, and wherein
  (3) said first and second ports of all of said intensifier assemblies are in the form of first and second rails extending longitudinally through said housing.

18. A fuel injection system as claimed in claim 15, wherein said housing is mounted on an external surface of said valve cover.

19. A fuel injection system as claimed in claim 14, wherein said intensifier assembly is incorporated into an intensifier bore in said cylinder head.

20. A fuel injection system for an internal combustion engine having a cylinder head capped by a valve cover, said fuel injection system comprising:

A. an injector assembly inserted into said cylinder head;
B. an intensifier assembly mounted on said internal combustion engine at a location remote from said injector assembly, said intensifier assembly including a pressure intensifier and having formed therein a first port for the supply of fuel to said pressure intensifier, a second port for the supply of intensifier fluid to said pressure intensifier, and a third port for the supply of pressure intensified fuel to said injector assembly; and
C. a conduit connecting said third port of said intensifier assembly to said injector assembly, wherein
said intensifier assembly comprises a housing which is mounted on a sidewall of said cylinder head, which has said pressure intensifier disposed therein, and in which is formed said first, second, and third ports, said intensifier assembly is incorporated into an intensifier bore in said cylinder heads, several additional intensifier assemblies are incorporated into respective intensifier bores in said cylinder head, first and second longitudinal rails are formed in said cylinder head, the first port of each of said intensifier assemblies comprises a bore formed in said cylinder head and connecting the associated intensifier bore to said first rail, and wherein the second port of each of said intensifier assemblies comprises another bore formed in said cylinder head and connecting the associated intensifier bore to said second rail.

21. A fuel injection system for an internal combustion engine having a cylinder head capped by a valve cover, said fuel injection system comprising:

A. an injector assembly inserted into said cylinder head and projecting vertically from said cylinder head;

B. a pressure intensifier mounted on said internal combustion engine at a location remote from said injector assembly;

C. a solenoid operated valve mounted on said internal combustion engine at a location remote from said injector assembly;

D. a first port for the supply of fuel to said pressure intensifier;

E. a second port for the supply of intensifier fluid to said solenoid operated valve; and F. a third port for the discharge of pressure intensified fuel from said pressure intensifier, wherein
said solenoid operated valve is operable to selectively connect said second port to a low pressure chamber of said pressure intensifier and to a spill port; and G. a conduit connecting said third port of said intensifier assembly to said injector assembly.

22. A fuel injection system as defined in 21, wherein (1) said intensifier assembly comprises a housing which is mounted on a sidewall of said cylinder head, which has said pressure intensifier disposed therein, and in which is formed said first, second, and third ports, wherein (2) said housing receives several intensifier assemblies each including a pressure intensifier, and wherein (3) said first and second ports of all of said intensifier assemblies are in the form of first and second rails extending longitudinally through said housing.

* * * * *